United States Patent
Lyman

(10) Patent No.: US 8,571,202 B2
(45) Date of Patent: *Oct. 29, 2013

(54) UNIVERSAL QUEUING FOR INBOUND COMMUNICATIONS

(71) Applicant: Christopher M. Lyman, Los Angeles, CA (US)

(72) Inventor: Christopher M. Lyman, Los Angeles, CA (US)

(73) Assignee: Fonality, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,841

(22) Filed: Jan. 10, 2013

(65) Prior Publication Data

US 2013/0148800 A1    Jun. 13, 2013

Related U.S. Application Data

(63) Continuation of application No. 11/800,302, filed on May 3, 2007, now Pat. No. 8,379,832.

(51) Int. Cl.
 *H04M 3/00* (2006.01)

(52) U.S. Cl.
 USPC ............ 379/265.09; 379/265.04; 379/266.02

(58) Field of Classification Search
 USPC ............ 379/265.09, 265.03, 265.04, 265.11, 379/265.12, 266.01, 266.02
 See application file for complete search history.

(56) References Cited

U.S. PATENT DOCUMENTS

| | | | |
|---|---|---|---|
| 4,653,090 A | 3/1987 | Hayden | |
| 5,533,110 A | 7/1996 | Pinard et al. | |
| 5,754,636 A | 5/1998 | Bayless et al. | |
| 5,854,834 A | 12/1998 | Gottlieb et al. | |
| 5,940,488 A | 8/1999 | DeGrazia et al. | |
| 6,104,711 A | 8/2000 | Voit | |
| 6,137,869 A | 10/2000 | Voit et al. | |
| 6,282,574 B1 | 8/2001 | Voit | |
| 6,359,880 B1 | 3/2002 | Curry et al. | |
| 6,389,132 B1 * | 5/2002 | Price | 379/265.01 |
| 6,400,719 B1 | 6/2002 | Chimura et al. | |
| 6,418,214 B1 | 7/2002 | Smythe et al. | |

(Continued)

FOREIGN PATENT DOCUMENTS

| | | |
|---|---|---|
| WO | WO2004049121 A2 | 6/2004 |
| WO | WO2005036330 A2 | 4/2005 |
| WO | WO2006020168 A2 | 2/2006 |

OTHER PUBLICATIONS

Parmar, Rashik "Enhanced Enterprise Communication: Transforming the bank into a proactive relationship center." IBM Global Services. May 2004.

(Continued)

*Primary Examiner* — Antim Shah
(74) *Attorney, Agent, or Firm* — Carr & Ferrell LLP

(57) ABSTRACT

Exemplary systems and methods for queuing an inbound communication are provided. In exemplary embodiments, the inbound communication is received by a communication server associated with a communication type of the inbound communication. Communication statuses of one or more agents over a plurality of communication types are reviewed to determine available agents. One or more profiles are reviewed to assess applicability of one or more agents to receive the inbound communication, whereby an agent may be applicable to handle more than one inbound communication concurrently as determined by their profile. An appropriate agent is then selected based on the availability and applicability of the one or more agents to which the inbound communication is forwarded.

21 Claims, 7 Drawing Sheets

(56) References Cited

U.S. PATENT DOCUMENTS

| | | |
|---|---|---|
| 6,430,275 B1 | 8/2002 | Voit et al. |
| 6,430,289 B1 | 8/2002 | Liffick |
| 6,453,038 B1 | 9/2002 | McFarlane et al. |
| 6,628,765 B1 | 9/2003 | Bangs et al. |
| 6,718,030 B1 | 4/2004 | Turner et al. |
| 6,820,083 B1 | 11/2004 | Nagy et al. |
| 6,937,703 B1 | 8/2005 | Andreason |
| 6,964,370 B1 | 11/2005 | Hagale et al. |
| 7,007,074 B2 | 2/2006 | Radwin |
| 7,031,442 B1 | 4/2006 | Neyman et al. |
| 7,035,619 B1 | 4/2006 | Fargano et al. |
| 7,035,923 B1 | 4/2006 | Yoakum et al. |
| 7,039,165 B1 | 5/2006 | Saylor et al. |
| 7,065,184 B2 | 6/2006 | Vishik et al. |
| 7,076,036 B1 | 7/2006 | Johnson |
| 7,089,237 B2 | 8/2006 | Turnbull et al. |
| 7,092,509 B1 * | 8/2006 | Mears et al. ............ 379/266.01 |
| 7,120,238 B1 | 10/2006 | Bednarz et al. |
| 7,136,875 B2 | 11/2006 | Anderson et al. |
| 7,194,531 B2 | 3/2007 | Donker et al. |
| 7,213,073 B1 | 5/2007 | Slavin |
| 7,274,781 B2 | 9/2007 | Lipton et al. |
| 7,333,976 B1 | 2/2008 | Auerbach et al. |
| 7,477,730 B2 | 1/2009 | Starbuck et al. |
| 7,496,185 B1 | 2/2009 | Primavesi et al. |
| 7,496,189 B2 | 2/2009 | Clarisse et al. |
| 7,536,000 B2 | 5/2009 | Ho |
| 7,567,662 B1 | 7/2009 | Renner et al. |
| 7,586,908 B2 | 9/2009 | Nelson et al. |
| 7,664,096 B2 | 2/2010 | Doherty et al. |
| 7,664,495 B1 | 2/2010 | Bonner et al. |
| 7,685,010 B2 | 3/2010 | Goldberg et al. |
| 7,706,522 B2 * | 4/2010 | Shaffer et al. ............ 379/265.11 |
| 7,711,104 B1 | 5/2010 | Flockhart et al. |
| 7,716,263 B2 | 5/2010 | Masek |
| 7,835,510 B2 | 11/2010 | Akachi |
| 7,844,677 B1 | 11/2010 | Asher et al. |
| 7,881,454 B2 | 2/2011 | Tuchman et al. |
| 7,920,549 B2 | 4/2011 | Alt et al. |
| 7,983,404 B1 | 7/2011 | Croak et al. |
| 8,131,872 B2 | 3/2012 | Kennedy et al. |
| 8,132,001 B1 | 3/2012 | Patten et al. |
| 8,223,941 B2 | 7/2012 | White et al. |
| 8,379,832 B1 * | 2/2013 | Lyman ............ 379/265.09 |
| 2002/0009073 A1 | 1/2002 | Furukawa et al. |
| 2002/0029258 A1 | 3/2002 | Mousseau et al. |
| 2002/0035605 A1 | 3/2002 | McDowell et al. |
| 2002/0116336 A1 | 8/2002 | Diacakis et al. |
| 2002/0120687 A1 | 8/2002 | Diacakis et al. |
| 2003/0002521 A1 | 1/2003 | Traversat et al. |
| 2003/0009530 A1 | 1/2003 | Philonenko et al. |
| 2003/0026414 A1 * | 2/2003 | Baker et al. ............ 379/265.13 |
| 2003/0078986 A1 | 4/2003 | Ayres et al. |
| 2003/0219029 A1 | 11/2003 | Pickett |
| 2003/0228010 A1 | 12/2003 | Clarisse et al. |
| 2004/0001573 A1 | 1/2004 | Gusler et al. |
| 2004/0039889 A1 | 2/2004 | Elder et al. |
| 2004/0062383 A1 | 4/2004 | Sylvain |
| 2004/0083306 A1 | 4/2004 | Gloe |
| 2004/0088356 A1 | 5/2004 | Sellen et al. |
| 2004/0093387 A1 | 5/2004 | Wick |
| 2004/0107267 A1 | 6/2004 | Donker et al. |
| 2004/0133888 A1 | 7/2004 | Ard et al. |
| 2004/0141508 A1 | 7/2004 | Schoeneberger et al. |
| 2004/0170267 A1 | 9/2004 | Seligmann |
| 2004/0179672 A1 | 9/2004 | Pagel et al. |
| 2004/0203944 A1 | 10/2004 | Huomo et al. |
| 2004/0218747 A1 | 11/2004 | Ranalli et al. |
| 2004/0246331 A1 | 12/2004 | Caspi et al. |
| 2004/0260771 A1 | 12/2004 | Gusler et al. |
| 2004/0264670 A1 | 12/2004 | Flores et al. |
| 2004/0267887 A1 | 12/2004 | Berger et al. |
| 2005/0068166 A1 | 3/2005 | Baker |
| 2005/0068227 A1 | 3/2005 | Caspi et al. |
| 2005/0074101 A1 | 4/2005 | Moore et al. |
| 2005/0076095 A1 | 4/2005 | Mathew et al. |
| 2005/0105709 A1 | 5/2005 | Dutronc et al. |
| 2005/0201362 A1 | 9/2005 | Klein et al. |
| 2005/0209861 A1 | 9/2005 | Hewes et al. |
| 2005/0220283 A1 | 10/2005 | Ho |
| 2005/0239501 A1 | 10/2005 | Idnani et al. |
| 2005/0243978 A1 | 11/2005 | Son et al. |
| 2005/0246588 A1 | 11/2005 | Deng et al. |
| 2006/0019655 A1 | 1/2006 | Peacock |
| 2006/0039545 A1 | 2/2006 | Rahman et al. |
| 2006/0093099 A1 | 5/2006 | Cho |
| 2006/0093121 A1 | 5/2006 | Sylvain |
| 2006/0109811 A1 | 5/2006 | Schotten et al. |
| 2006/0117264 A1 | 6/2006 | Beaton et al. |
| 2006/0121916 A1 | 6/2006 | Aborn et al. |
| 2006/0146870 A1 | 7/2006 | Harvey et al. |
| 2006/0147009 A1 | 7/2006 | Greenlee et al. |
| 2006/0166678 A1 | 7/2006 | Karaoguz et al. |
| 2006/0167747 A1 | 7/2006 | Goodman et al. |
| 2006/0177032 A1 | 8/2006 | Abramson et al. |
| 2006/0185004 A1 * | 8/2006 | Song et al. ............ 726/8 |
| 2006/0195532 A1 | 8/2006 | Zlateff et al. |
| 2006/0210046 A1 | 9/2006 | Smith |
| 2006/0212519 A1 | 9/2006 | Kelley et al. |
| 2006/0256789 A1 | 11/2006 | Otto et al. |
| 2006/0256942 A1 | 11/2006 | Gatzke et al. |
| 2006/0288099 A1 | 12/2006 | Jefferson et al. |
| 2007/0011337 A1 | 1/2007 | Brown et al. |
| 2007/0061197 A1 | 3/2007 | Ramer et al. |
| 2007/0078708 A1 | 4/2007 | Yu et al. |
| 2007/0204218 A1 | 8/2007 | Weber et al. |
| 2007/0217434 A1 | 9/2007 | Welbourn |
| 2007/0244973 A1 | 10/2007 | Pearson |
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 * | 7/2008 | Ryabchun et al. ............ 709/227 |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2010/0174807 A1 | 7/2010 | Lyman et al. |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2012/0266080 A1 | 10/2012 | Zellner et al. |
| 2013/0022038 A1 | 1/2013 | Cadiz et al. |
| 2013/0108035 A1 | 5/2013 | Lyman |

OTHER PUBLICATIONS

"Montgomery, Warren & Copeland, Rebecca ""Network Intelligence for Presence Enhanced Communication."" Nov. 2001. http://tools.ietf.org/id/draft-montgomery-copeland-presence-spirits-00.txt".

(56) References Cited

OTHER PUBLICATIONS

Ott, Jorg "Presence Aggregation in Endpoints." Technologiezentrum Informatik, Jan. 2003.

Broder, et al., Search Advertising Using Web Relevance Feedback, 2008, pp. 1013-1022, Conference on Information and Knowledge Management, Proceeding of the 17th AC conference on Information and Knowledge Management. Yahoo Research. Oct. 2008.

"Hull, et al., Enabling Context-Aware and Privacy-Conscious User Data Sharing, 2004, Proceedings of the 2004 IEEE International Conference on Mobile Data Management. Aug. 2004. Accessed Aug. 2011. http://ieeexplore.ieee.org/xpl/freeabs_all.jsp?arnumber= 1324414".

Inter-Tel, Inc. "Advanced Applications Design Guide for Contact Center Suite." Issue 1. Apr. 2006.

"User Guide, What is Xact View? Xact View User Guide, Schmooze Communications LLC 2008. Accessed Aug. 2011. www.schmoozecom.com. http://literature.schmoozecom.com/XactView/UserGuide/UserGuideXactView.pdf".

* cited by examiner

UNIVERSAL QUEUING FOR INBOUND COMMUNICATIONS

CROSS REFERENCE TO RELATED APPLICATIONS

This application claims priority benefit of, and is a continuation of, U.S. nonprovisional application Ser. No. 11/800,302 filed on May 3, 2007, entitled "Universal Queuing for Inbound Communications," which is incorporated herein by reference.

BACKGROUND OF THE INVENTION

1. Field of the Invention

Embodiments of the present invention relate generally to call centers and more particularly to queuing inbound communications to the call center.

2. Background Art

In a conventional call center environment, a group of agents are available for receiving a voice call from a customer. Typically, a decision is made based on availability of agents, type of service desired, and time zone in order to determine which agent will receive the voice call. Currently, an agent will press a button or enter a key sequence on their phone to log them in and mark the agent as available to receive the voice call. When the voice call is completed, the agent will hang up, thus marking them ready for the next voice call. To stop receiving calls, the agent will press a button or enter another key code to log them out.

While the above described system indicates a call center environment focused on voice calls, the agent may also be available through other communication mechanisms, such as e-mail or chat/instant messaging. To insure proper customer service, the agent may be on a single communication device responding to one communication at a time. For example, an inexperience agent may not want to be responding to an e-mail and be on a voice call at the same instance. However, a more experienced agent or supervisor may be able to handle multiple communications at the same time.

Therefore, there is a need for a system that maximizes productivity of agents given a plurality of different types of communication mechanisms.

SUMMARY

Embodiments of the present invention provide systems and methods for queuing an inbound communication across a plurality of communication media. The inbound communication is directed to an appropriate agent based on associated agent profiles and communication statuses of the agents.

In exemplary embodiments, the inbound communication is received by a communication server associated with a communication type of the inbound communication. For example, an e-mail message will be received by an e-mail server while a voice call will be received by a PBX server.

Communication statuses of one or more agents over a plurality of communication types and communication devices are reviewed to determine if an agent is available to handle the inbound communication. The communication status of the agent may be determined by a status module that either receives a communication status from each communication device and/or communication server associated with each agent, or requests a communication status from each communication device and/or communication server associated with the agents. In some embodiments, the status check may occur in real-time.

A determination of which agent to direct the inbound communication to is then performed. One or more profiles are reviewed to assess applicability of one or more agents to receive the inbound communication, whereby an agent may be applicable to handle more than one inbound communication concurrently as determined by their profile. Profiles may be assigned to individual agents, a group of agents, or a combination of both. These profiles provide guidelines or rules that indicate applicability of an agent to receive an inbound communication. The profile may indicate how an agent may respond to a plurality of inbound communications concurrently, provide priority or levels of access, and allow agent preferences.

An appropriate agent is then selected based on the availability and applicability of the agents in the call center. If the selected agent is available, the inbound communication is routed to the corresponding communication device of the appropriate agent. After the selected agent receives the inbound communication, the communication status of the agent is updated. The updated status may affect the agent's ability to handle one or more new inbound communications as determined by their profile.

DETAILED DESCRIPTION OF EXEMPLARY EMBODIMENTS

Embodiments of the present invention provide systems and methods for universal queuing of inbound communications to a call center. In exemplary embodiments, the inbound communication may comprise a voice call via POTS, a voice call via VoIP, an e-mail message, a chat message, text message, a voice call via a mobile device, or any other communication type or mechanism. These inbound communications are received by respective communication servers or other computing devices, queued, and delivered to a selected agent of the call center based on a profile associated with the agent and the agent's current availability status.

In exemplary embodiments, each agent is associated with one or more communication devices, which in combination may be configured to receive a plurality of different types of communications. An agent may respond to one or more inbound communications concurrently based on their associated profile and current communication (availability) status. For example, when the agent receives an inbound communication, such as a phone call, the agent may be unavailable to receive another phone call. However, the agent may be available for other types of inbound communications such as an e-mail. Alternatively, the agent may be capable of handling multiple communications of the same type. For example, the agent may be able to conduct chat sessions with three customers concurrently. Thus, embodiments of the present invention provide a mechanism to determine the communication statuses of the agents across a plurality of different communication types and devices, and determine based on their profiles and availability (e.g., communication statuses) how best to distribute inbound communications to maximize productivity of the agents.

Figure 1:
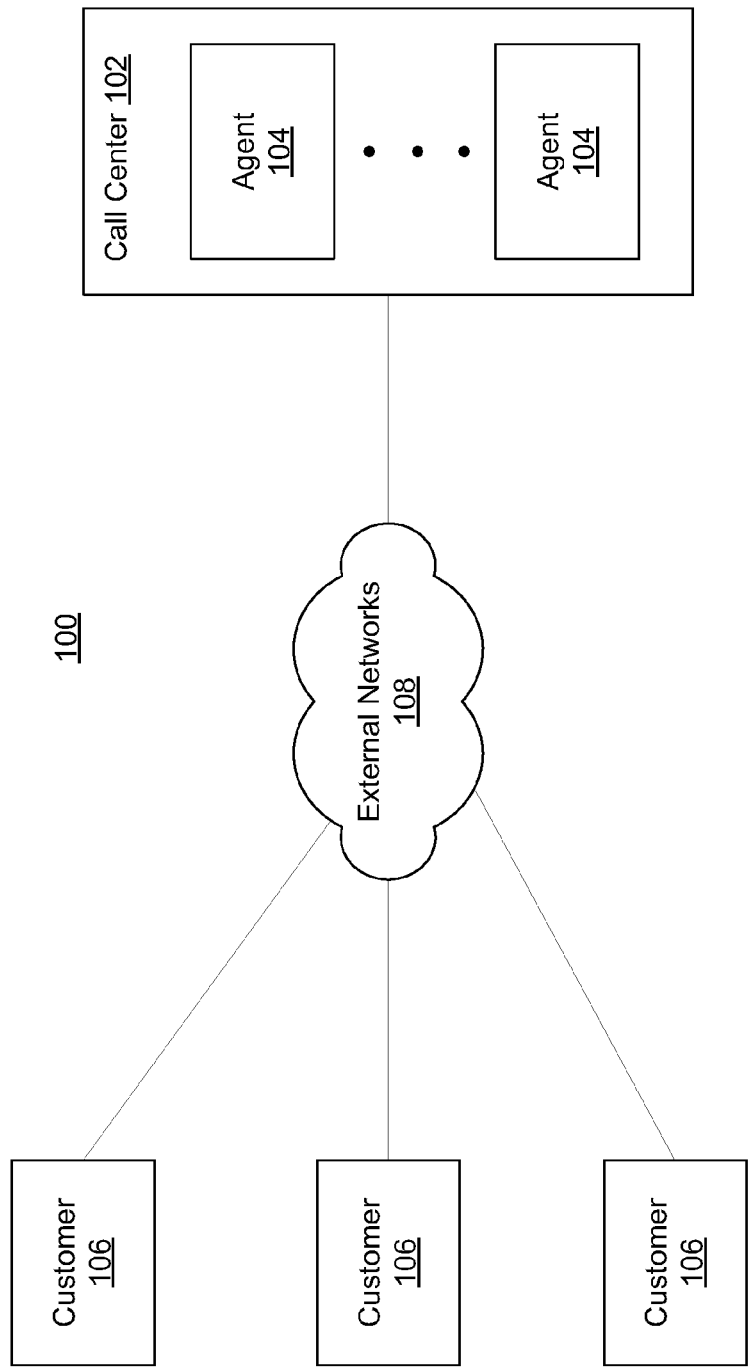
FIG. 1 is a diagram of an environment in which embodiments of the present invention may be practiced.

FIG. 1 shows an exemplary environment 100 in which embodiments of the present invention may be practiced. The exemplary environment 100 comprises a call center 102 having a plurality of agents 104. The call center 102 is configured to receive inbound communications from a plurality of customers 106 via an external network 108, and direct each inbound communication to an appropriate agent 104. It should be noted that the call center 102 may receive any type of communication including voice calls, e-mail messages, chat/instant messages, and text messages, for example.

In exemplary embodiments, each agent 104 may be capable of receiving inbound communications via a plurality of communication devices. For example, the agent 104 may be accessible via a phone (e.g., POTS voice call) and a computing device (e.g., e-mail message and chat/instant messages). In some instances, the agent 104 is capable of responding to more than one inbound communication at the same time. Thus, when the agent 104 is responding to an e-mail message, for example, the agent may not be available for chat, but the agent 104 may be able to handle a voice call. Alternatively, the agent 104 may be capable of handling two chat sessions at the same time, while responding to an e-mail. A profile associated with the agent 104 will indicate the various combination of inbound communications the agent 104 may handle concurrently. That is, the profile will, in exemplary embodiments, provide a set of rules which will determine how many and what types of inbound communications the agent 104 can handle at any one time, as well as agent preferences. As such, the profiles provide guidance as to whether it is applicable to forward the inbound communication to an agent 104.

The customer 106 comprises any individual that desires to contact the call center 102. In various embodiments, the customer 106 may have questions or require a service of some sort from the call center 102. The customer 106 may send any type of communication to the call center including, but not limited to, voice calls, e-mail messages, chats messages, and text messages.

The external network 108 comprises any wired or wireless network necessary for the transfer of the inbound communication from the customer 106 to the call center 102. One embodiment of the external network 108 comprises a PSTN configured to transmit POTS voice calls. Another embodiment of the external network 108 comprises the Internet or other wide area network configured to transmit e-mails, chat/instant messages, and voice calls (i.e., VoIP). In yet another embodiment, the external network 108 comprises a cellular network configured to transmit voice calls and text messages from a mobile device. Any number of external networks 108 may be provided in the environment 100.

While any type of communication may be utilized in various embodiments of the present invention, for simplicity, the following description will limit discussion to voice calls over POTS, e-mail messages, and chat/instant messages. It will be understood that the following description may be extended to cover other types of communications.

Figure 2:
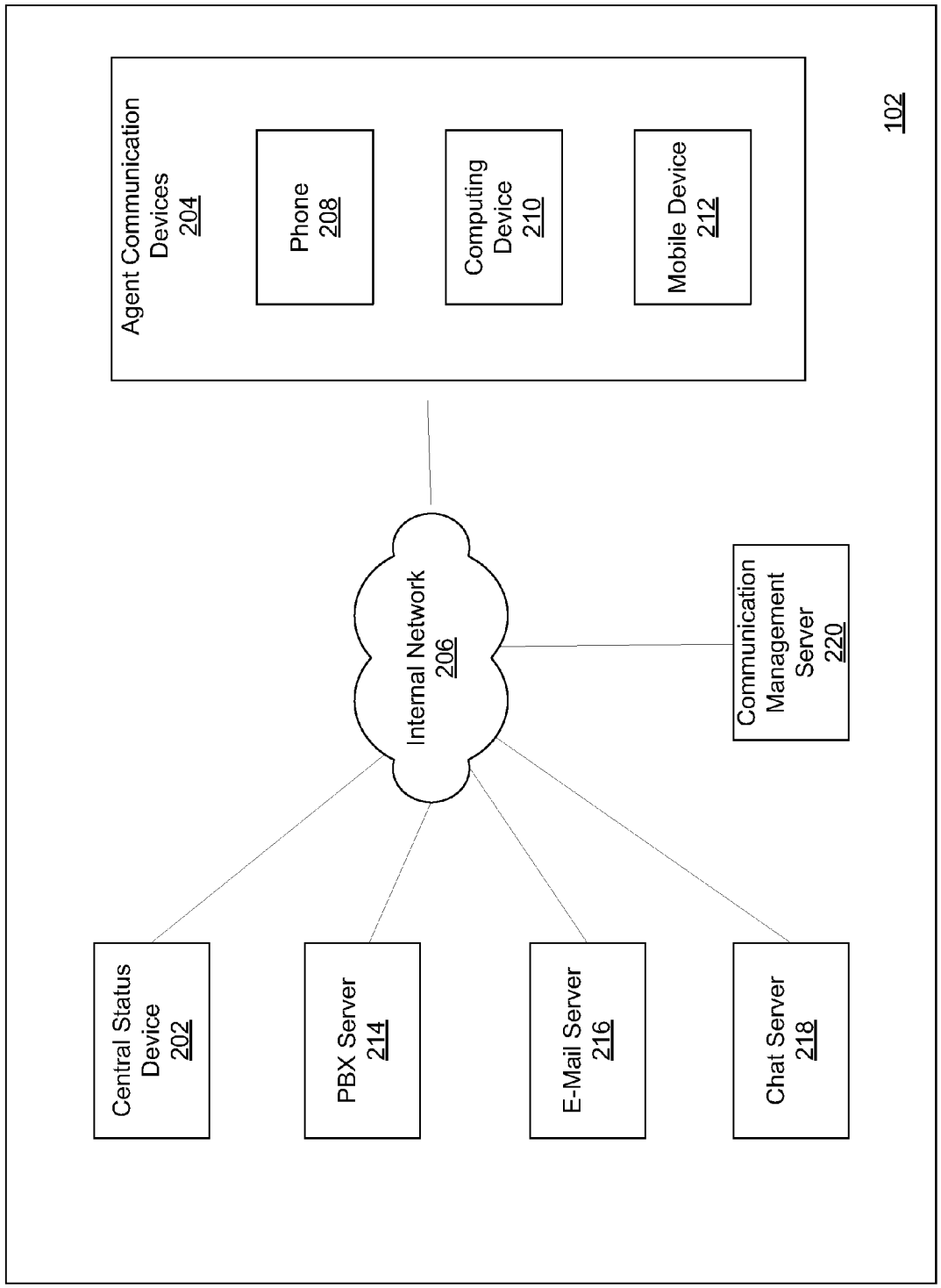
FIG. 2 is a diagram of an exemplary call center.

Referring now to FIG. 2, a block diagram of the exemplary call center 102 is shown. The call center 102 comprises a central status device 202 and a plurality of communication servers configured to route inbound communications from the customers 106. The exemplary central status device 202 is configured to maintain a status and profile for every agent 104 in the call center 102. The central status device 202 may also maintain a status of every inbound communication from the plurality of communication servers. Inbound communication status may comprise a type of inbound communication as well as a number of inbound communications. In some embodiments, the central status device 202 comprises a central server distinct from the communication servers of the call center 102. In other embodiments, one of the communication servers or a computing device of the agent 104 may function as the central status device 202. The central status device 202 will be discussed in more detail in connection with FIG. 3.

Each communication server is configured to receive an associated inbound communication and forward the inbound communication over an internal network 206 to a corresponding agent communication device 204. In the present embodiment, the agent communication devices 204 comprise a phone 208 for receiving voice calls and a computing device 210 for receiving e-mails and chat/instant messages. In some embodiments, the agent communication device 204 may comprise a mobile device 212 such as a cellular phone or laptop computer. Any type of agent communication device 204 may be associated with the agent 104, and is not limited to those shown or described herein.

In the present exemplary embodiment, the communication servers comprise a PBX server 214, an e-mail server 216, and a chat server 218. The PBX server 214 is configured to receive a voice call via POTS and forward the voice call over the internal network 206 to the phone 208 of the agent 104. In some embodiments, the PBX server 214 also receives and forwards VoIP calls. The e-mail server 216 is configured to receive an e-mail message from the customer 106 and forward the e-mail message to the computing device 210 of the agent 104. The chat server 218 is configured to receive a chat message and forward the chat message to the computing device 210.

In some embodiments, the communication servers may also comprise a communication management server 220. The exemplary communication management server 220 comprises a server that is configured to create an information record of inbound communications. The communication management server 220 may further use the information record to create business opportunities by coordinating the information record and inbound communication with appropriate agents. For example, the communication management server 200 may be a SugarCRM server that can determine which available agents to direct or assign a current inbound communications to whom can handle the business opportunity. In various embodiments, the communication management server 220 can route one or more types of inbound communications (e.g., phone calls, chats, etc.) and maintain a record of these inbound communications. Other examples would include any CRM system that handles and queues inbound communications from multiple sources. In such embodiments, these systems may then integrate and enhance these servers with universal queuing and universal agents.

It should be noted that the embodiment of FIG. 2 is exemplary. Alternative embodiments may comprise any number and combination of central status devices 202 and servers 214-220. For example, the system may comprise only a communication management server 220 that receives and routes the inbound communication while creating an information record.

In some embodiments, the voice call, e-mail message, and/or the chat message may be forwarded to the mobile device 212. If other communication types are enabled to be received by the call center 102, then corresponding communication servers are provided in the call center 102 for receiving and forwarding the communication to the appropriate agent communication device 204.

Figure 3:
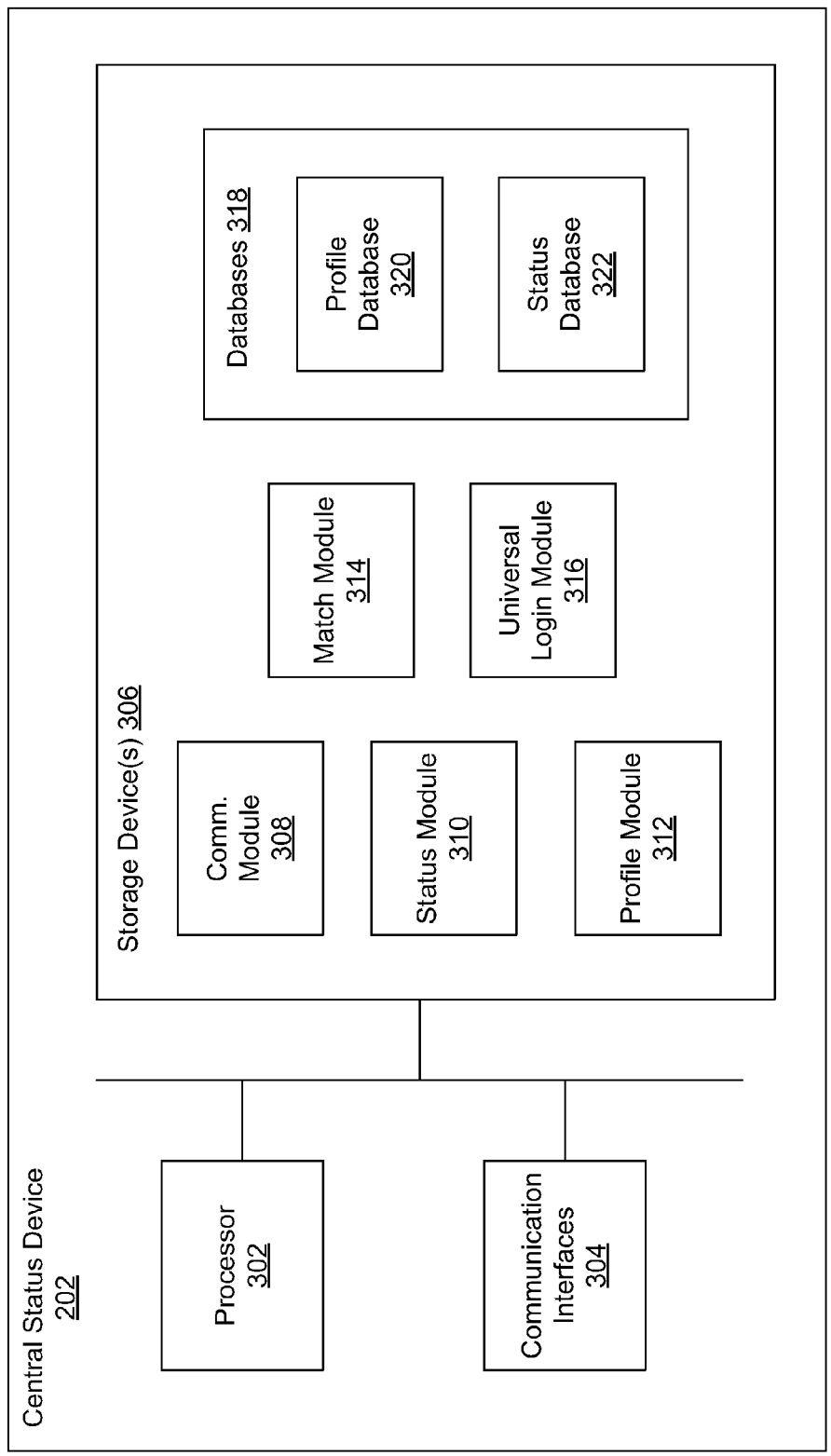
FIG. 3 is a block diagram of an exemplary central status device.

Referring now to FIG. 3, the exemplary central status device 202 is shown in more detail. In various embodiments, the central status device 202 comprises a processor 302, one or more communication interfaces 304, and at least one storage device 306. In exemplary embodiments, the central status device 202 is configured to maintain the status and profiles of every agent 104 on every agent communication device 204 of the call center 102. In further embodiments, the central status device 202 may also be configured to determine the agent 104 to which an inbound communication should be directed to as will be described below.

In exemplary embodiments, the communication interfaces 304 are configured to allow the central status device 202 to communicate with the various communication servers (e.g., servers 214, 216, and 218) and the agent communication devices 204.

The exemplary storage device 306 may comprise a communication module 308, a status module 310, a profile module 312, a match module 314, an universal login module 316, and databases 318. In some embodiments, the various components of the storage device 306 may be located in a plurality of different storage devices 306. In other embodiments, one or more of the storage devices 306 may be located outside of the central status device 202, but be coupled thereto. It should be noted that the storage device 306 is exemplary, and that alternative embodiments may comprise more, fewer, or functionally equivalent components and still be within the scope of exemplary embodiments. For example, the communication module 308 and the universal login module 316 may be optional. Alternatively, the match module 314 and one or more of the databases 318 may be located at the communication servers or agent communication devices 204.

In exemplary embodiments, the databases 318 comprise a profile database 320 and an optional status database 322. Alternative embodiments may comprise other databases or store the profile database 320 and/or status database 322 in another device or location. The profile database 320 and status database 322 will be discussed in more details below.

The communication module 308 is configured to determine the inbound communication type. For example, if the PBX server 214 forwards a request for an available agent 104, the communication module 308 will determine that the inbound communication is a voice call via POTS. This determination may be utilized by the match module 314, as will be described below.

The status module 310 is configured to maintain and update communication status for every agent 104 on every agent communication device 204 for every communication type. In some embodiments, the status module 310 will receive periodic status updates from the agent communication devices 204 and/or the communication servers. In other embodiments, the status module 310 will request a status from each agent communication device 204 and/or communication server. The current communication status(es) may then be stored in the status database 322. Alternatively, the status may be determined in real-time by the status module 310, and need not be stored in a status database 322. As such, the status module 310 enables determination of the availability of the agents 104 to receive inbound communications.

The exemplary profile module 312 is configured to maintain profile information and to review the profile information stored in the profile database 320 when an inbound communication needs to be directed to an agent 104. As such, the exemplary profile module 312 may determine applicability of forwarding an inbound communication to an agent 104.

In exemplary embodiments, the profiles provide rules for distribution of inbound communication to an applicable agent 104. These rules may comprise, for example, types of communication devices associated with the agent 104, combinations of inbound communication numbers and types an agent 104 may handle concurrently, levels of accessibility, emergency overrides, and agent preferences.

In various embodiments, a particular group of agents 104 (e.g., sales agents) may be organized into different levels. As such, a level of accessibility may be assigned to each agent 104 in this group such that, for example, a general call will be directed to a level one agent 104, while a more complex call regarding a specific account may be directed to a level two agent 104, and a "gold member" may access a level three agent 104. The level three agent 104 may provide more services and/or expertise to the gold member, for example.

In some embodiments, an emergency override rule may be provided in the profile. This emergency override rule allows, for example, the agent 104 to interrupt another agent's handling of an inbound communication. The emergency override rule may also allow an agent 104, in special circumstances, to handle a plurality of inbound communications and/or combinations of inbound communications concurrently, which the agent 104 normally does not handle.

In various embodiments, one or more profiles may be created and associated with each agent 104. In some embodiments, a group profile may be created which applies to all agents 104 within the group. For example, a sales support group may have a group profile that differs from the group profile of a technical support group.

In some embodiments, an individual profile may be created for the agent 104. The individual profile may be created via the profile module 312 and stored in the profile database 320. These individual profiles will be specific and tailored to each agent 104. For example, a more experienced agent 104 may have a profile that allows the agent 104 to handle a plurality of inbound communications at the same time. The profile for this agent 104 may indicate the types, numbers, and combinations of types and numbers of inbound communications that is allowed to be handled concurrently. For example, the agent 104 may be allowed to handle two chat sessions and one e-mail or handle one or more chat sessions but no voice calls concurrently. Any combination of inbound communication types and numbers may be regulated by the profile. In yet further embodiments, a combination of both group and individual profiles may be utilized by the central status device 202.

The match module 314 determines a match based on the communication type of the inbound communication, availability of agents 104 based on their communication statuses, and applicability of the inbound communication to the agents 104 based on corresponding profiles. The match process may comprise a cross-correlation of the availability of the agent 104 and the applicability of an agent 104 to determine one or more appropriate agents 104 to forward an inbound communication to. Additionally, a master rule set or policy may be stored or associated with profiles which provide a routing priority if more than one agent is available and applicable to receiving the inbound communication. An exemplary embodiment of this determination process is discussed in more detail in connection with FIG. 6.

In some embodiments, the match module 314 will take into consideration preferences stored in the profile database 320. For example, while the agent 104 may be available for voice calls, e-mail messages, and chat messages, the agent 104 may prefer to only respond to e-mail and chat messages between the hours of 11 am to 1 pm.

While the match module 314, status module 310, profile module 312, and associated databases 320 and 322 are shown as being embodied within the central status device 202, in some embodiments, the match module 314, status module 310, profile module 312, and/or associated databases 320 and 322 may be embodied within one or more of the communication servers (e.g., servers 214, 216, 218, or 220). In these embodiments, the determination as to which agent 104 to forward the inbound communication to is performed by the communication server receiving the inbound communication.

The universal login module 316 is configured to universally log the agent 104 into all enabled agent communication devices 204 and systems associated with the agent 104 with a single login action. For example, if the agent 104 attempts to log into their e-mail system, the universal login module 316 will log the agent 104 into all other agent communication devices 204 and systems, such as for chat and voice calls, associated with the agent 104. Similarly, when the agent 104 logs out of one agent communication device 204 or system, the universal login module 316 will log the agent 104 out of all other agent communication devices 204 and systems. In alternative embodiments, the agent 104 does not need to log in, but merely indicates that they are present and working (e.g., turns on their computing device or punches in for work). In these embodiments, the universal login module 316, or similar module, notifies all associated communication servers of the presence of the agent 104. In various embodiments, once logged in, the agent 104 has an available status (i.e., communication status indicates no inbound communications being handled).

In some embodiments, the central status device 202 comprises a dedicated central server distinct from the communication servers of the call center 102. In other embodiments, one of the communication servers or agent communication devices 204 may function as the central status device 202. For example, the computing device 210 may function as the central status device 202. In this example, the computing device 210 will know the communication status of the agent 104 if the agent 104 is either responding to an e-mail message or a chat message via the computing device 210. At the same time, the PBX server 214 will know the agent's status with respect to voice calls. If the computing device 210 is running software that is coupled to the PBX server 214 and allows the computing device 210 to obtain the communication status from the PBX server 214, then the computing device 210 will know the overall availability status for the agent 104 across all communication types and servers.

In an alternative example, the PBX server 214 may act as the central status device 202. In this example, the PBX server 214 will know the communication status of the agents 104 for voice calls. The computing device 210 of each agent 104 knows the status for e-mail and chat messaging, and communicates the communication status to the PBX server 214. Alternatively, the e-mail server 216 and the chat server 218 know the statuses of the agents 104 with respect to e-mail and chat messaging, and can communicate the communication statuses to the PBX server 214. As a result, the PBX server 214 knows the overall availability based on the communication statuses for the agents 104 across all communication types and servers.

Figure 4:
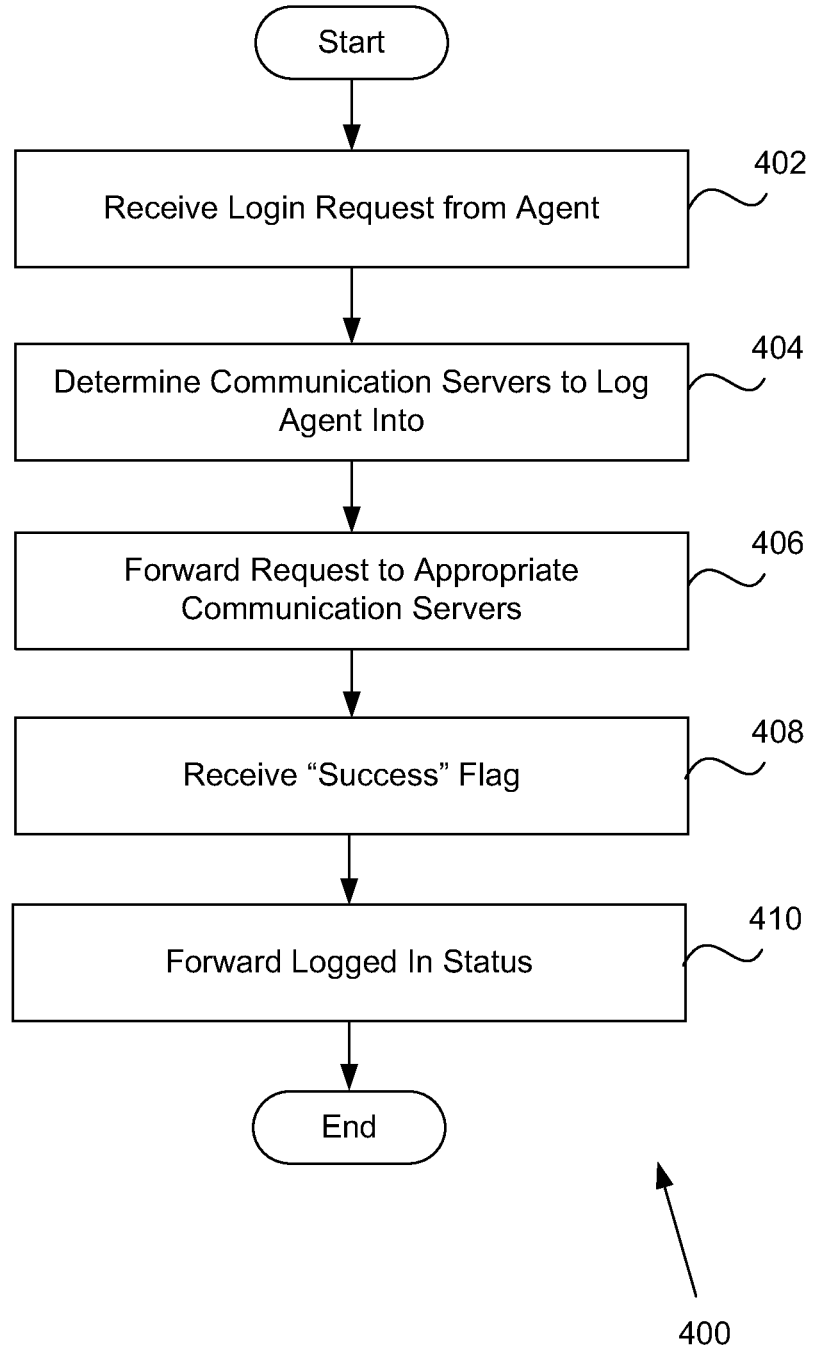
FIG. 4 is a flowchart of an exemplary method for universal login.

FIG. 4 is a flowchart 400 of a process for universal login. In step 402, a login request from an agent 104 is received. The login request may comprise a user name and password for the agent 104. In exemplary embodiments, the login request is received directly by the universal login module 316. In alternative embodiments, the login request is received by one agent communication device 204 associated with the agent 104 and forwarded to the universal login module 316. For example, the agent 104 may send a login request to their e-mail system. The computing device 210 comprising the e-mail system, in the present example, will then send the login data/confirmation to the universal login module 316. Similarly, the PBX server 214, in a phone login case, will forward the login request to the universal login module 316.

Subsequently, the universal login module 316 will determine which communication servers to log the agent 104 into. In exemplary embodiments, the universal login module 316 may query the profile module 312 and/or profile database 320 to determine which communication devices are associated with the agent 104 logging in. The profile associated with the agent 104 will contain information as to which communication devices the agent 104 utilizes.

In step 406, the universal login module 316 forwards the login request to all appropriate communication servers based on the associated communication devices determined in step 404. As such, the login request may be forwarded to the communication servers 214, 216, 218 and/or 220. In alternative embodiments, the login request may be sent to each communication device associated with the agent 104. The communication device then individually logs the agent 104 in.

The universal login module 316 then receives one or more "success" flags in step 408. These flags confirm that the agent 104 is logged in with one or more communications server 214, 216, and/or 218. Thus, for example, the PBX server 214 will return a login "success" flag to the universal login module 316 to indicate the agent 104 is logged in with the PBX server 214.

In step 410, the logged in status of the agent 104 is forwarded to the status module 310. In some embodiments, the status module 310 may update the status in the status database 322. The agent 104 now is available to receive inbound communications.

It should be noted that the agent 104 does not need to log in, according to an alternative embodiment. Instead, the agent 104 indicates that they are present and working (e.g., turns on their computing device or punches in for work). In these embodiments, the universal login module 316 notifies all associated communication servers of the presence of the agent 104 in step 406 and awaits a success or acknowledgement flag in step 408.

Figure 5A:
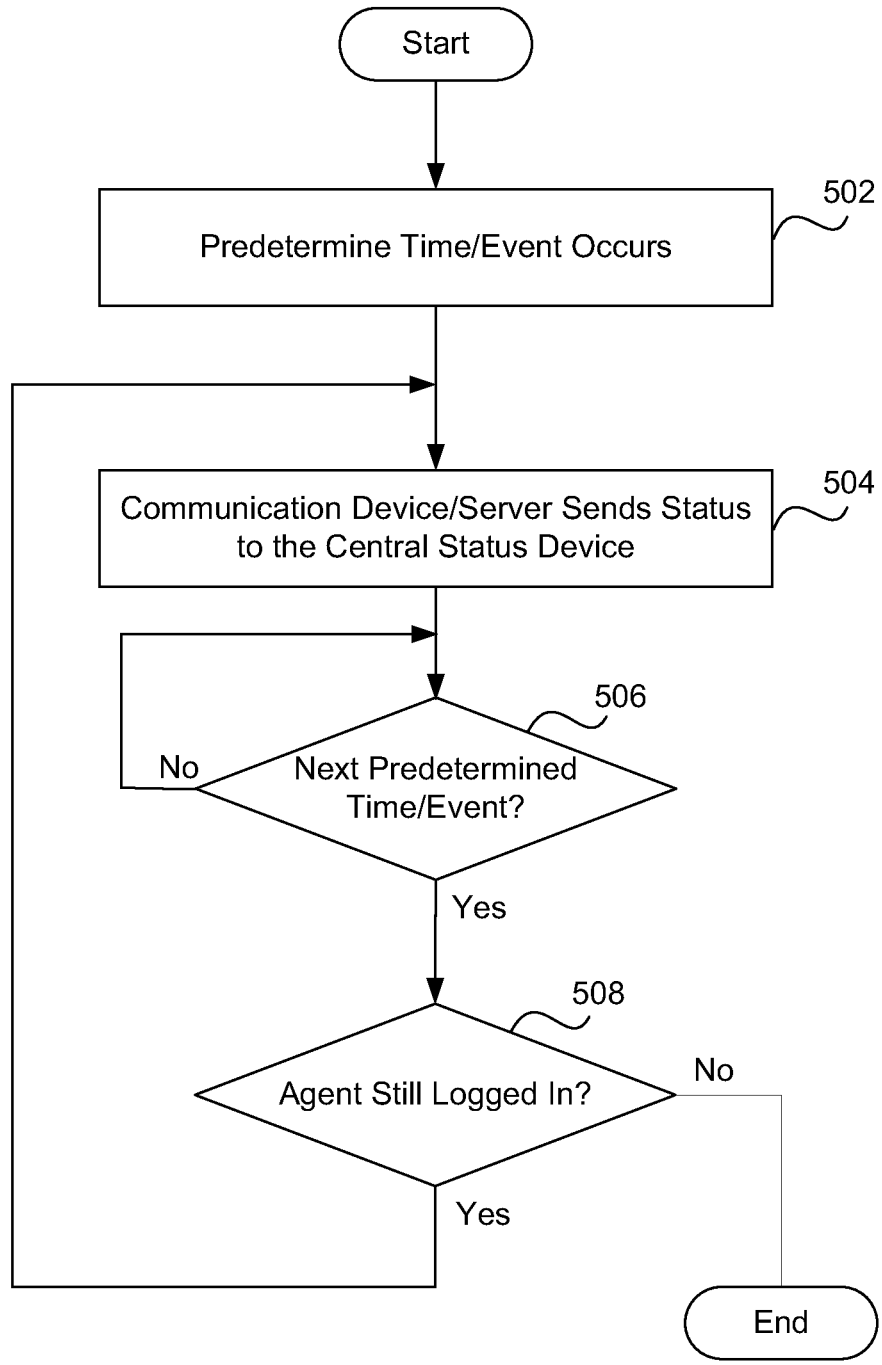
FIG. 5a is a flowchart of one method for maintaining communication status of an agent.

Referring to FIG. 5a, a flowchart 500 of one method for obtaining and maintaining availability status of the agent 104 is shown. In this embodiment, the agent communication devices 204 or the communication servers push their communication status data to the central status device 202. In step 502, a predetermined time or event occurs that triggers a status push from the agent communication devices 204 or communication servers. In one embodiment, the event may be startup or login of the agent 104. That is, when the agent 104 first logs in, a status will be pushed to the central status device 202. Another event which may trigger a status push, is the receipt of an inbound communication at the agent communication device 204. Alternatively, a predetermined time interval (e.g., every five minutes) may trigger the status push.

Upon the status check trigger, the agent communication device 204 or associated communication server sends a communication status update to the central status device 202 in step 504. Thus, for example, once a voice call is received by the phone 208, the PBX server 214 sends a communication status indicating that the agent 104 is on a voice call. In another example, the computing device 210 of the agent 104 may send a communication status indicating that the agent 104 is responding to an e-mail or chat message. The communication status may then be stored in the status database 322, according to some embodiments.

If a next predetermined time or event occurs in step 506, then the system determines if the agent associated with the agent communication devices 204 is still logged in or present in step 508. If the agent is still logged in or present, then a new communication status is sent to the central status device in step 504. The agent communication devices 204 and/or communication servers will continue to send status updates for the agent until the agent is no longer logged in or present.

Figure 5B:
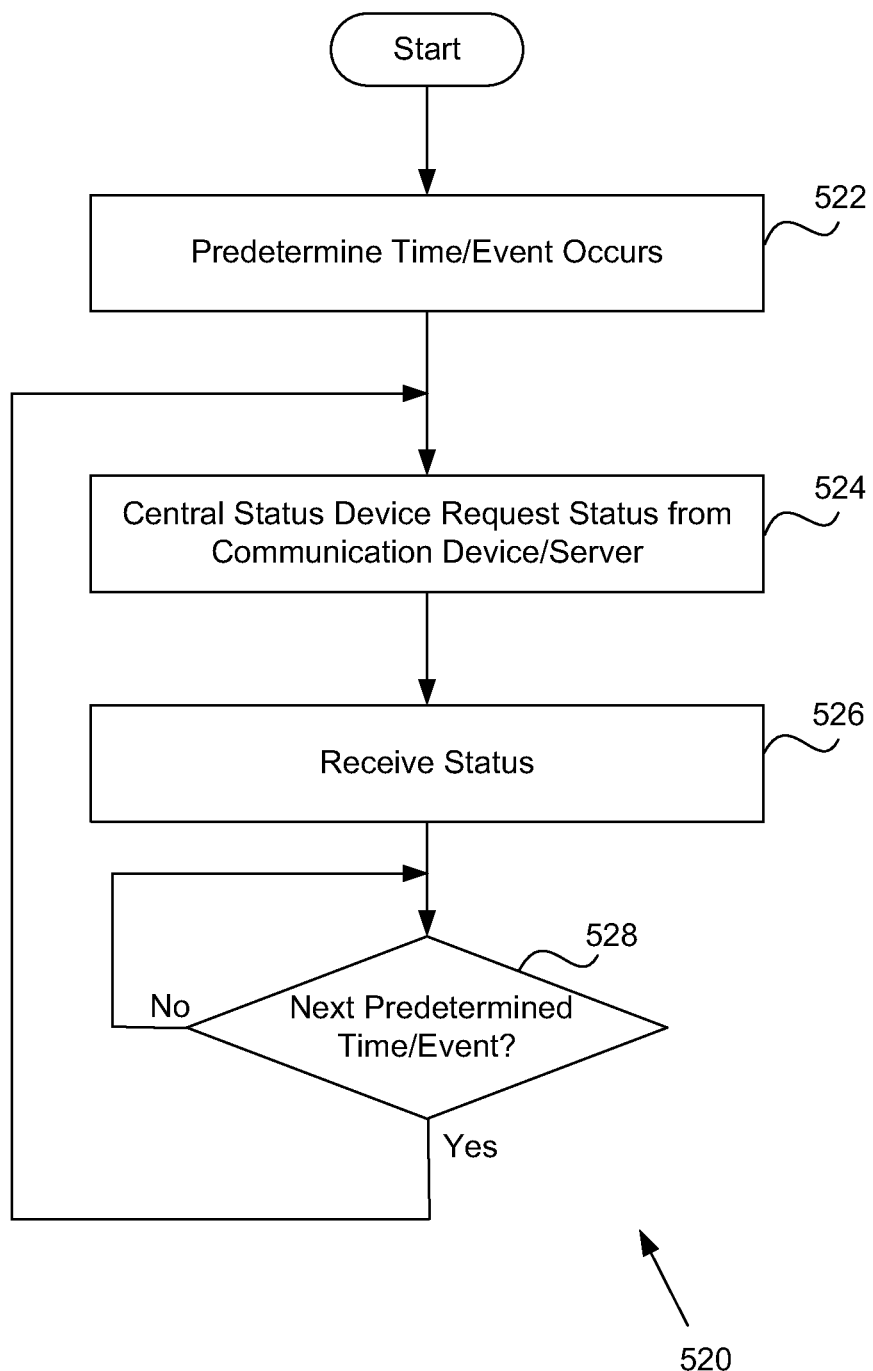
FIG. 5b is a flowchart of another method for maintaining communication status of the agent.

FIG. 5b shows a flowchart 520 of an alternative method for obtaining and maintaining status of the agent 104. In this embodiment, the central status device 202 pulls status data from the various agent communication devices 204 and/or communication servers. In step 522, a predetermined time or event occurs that triggers a status pull from the agent communication devices 204 or communication servers. In one embodiment, the event may be startup or login of the agent 104. Another event which may trigger a status pull, is the receipt of an inbound communication at one of the communication servers. Alternatively, a predetermined time interval (e.g., every five minutes) may trigger the status pull.

In step 524, the central status device 202 sends a request for communication status to the agent communication devices 204 and/or communication servers, such as the PBX server 214. Communication status is then received in step 526. In some embodiments, the communication status is stored into the status database 322.

In step 528, a determination is made as to whether a predetermined amount of time has elapsed or if a next event has occurred, which will trigger another status check of the agent communication devices 204 and/or communication servers. In some embodiments, the central status device 202 will check communication status after a predetermined interval of time (e.g., every 5 minutes). In other embodiments, the central status device 202 will perform a communication status check based on an event. The event may comprise receipt of a new inbound communication. For example, if a new voice call is received from a customer 106, a request for status from the PBX server 214 (i.e., the event) will trigger the central status device 202 to check communication status of the agents 104 over all the communication servers, devices, and systems. In yet other embodiments, a combination of predetermine elapsed time and event triggers may be utilized.

It should be noted that while two methods for determining communication status of the agent 104 are provided, alternative embodiments are contemplated. For example, a combination of the methods described in connection with FIG. 5a and FIG. 5b may be utilized. It should further be noted that each agent 104 may be available to handle more than one inbound communication at the same time. Therefore, for each inbound communication received by the call center 102, the processes of FIG. 5a or FIG. 5b may be repeated as needed.

Figure 6:
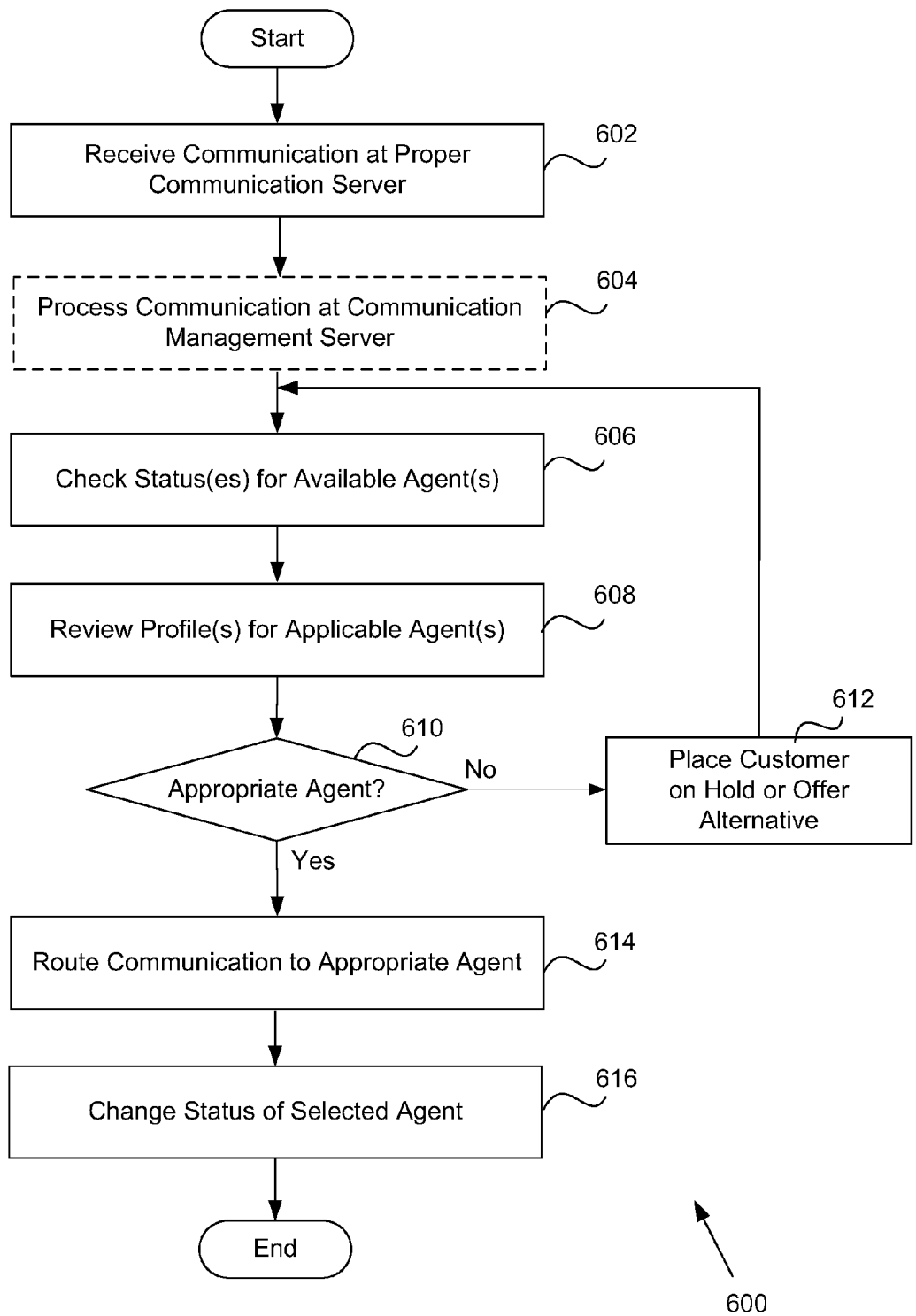
FIG. 6 is a flowchart of an exemplary method for queuing an inbound communication.

Referring now to FIG. 6, a flowchart 600 of an exemplary method for queuing an inbound communication from the customer 106 is shown. In step 602, the inbound communication is received by the appropriate communication server. For example, a voice call may be received by the PBX server 214, while an e-mail message is received by the e-mail server 216.

In optional step 604, if the communication server receiving the inbound communication is the communication management server 220, then the communication management server 220 will process the inbound communication. In exemplary embodiments, the communication management server 220 may create or update an information record associated with the inbound communication. Based on the information record, an appropriate set of one or more agents may be determined to be able to handle the inbound communication. Subsequently, the statuses and profiles of this set of agents may be reviewed.

For example, the communication management server 220 may receive a voice call from a regular customer (e.g., identified with caller ID). The information record for this customer may be updated to indicate that the customer is calling again with an inquiry. Based on the information record, one or more agents may be identified that have a relationship with this customer (e.g., agents that are assigned to the account). The availability and applicability of this set of agents may then be reviewed in the subsequent steps of this exemplary method.

In step 606, the availability of agents 104 are determined. According to one embodiment, the receipt of the inbound communication triggers a communication status check by the central status device 202, as discussed, for example, in connection with FIG. 5a or FIG. 5b. In alternative embodiments, the communication status check may occur at any time. For example, the communication statuses of agents 104 may be determined prior to receipt of the inbound communication. In some embodiments, the communication status is stored in the status database 322. Subsequently, the status module 310 may access the status database 322 to review the current statuses of agents 104 and determine availability of agents 104 to receive inbound communications. In other embodiments, the status is determined in real-time. The statuses may be checked for a plurality of agents 104 or for one agent 104 at a time.

In step 608, the profiles are reviewed in order to determine which applicable agent(s) 104 may receive the inbound communication. In exemplary embodiments, the communication module 308 determines the type of inbound communication that is received and forwards the information to the profile module 312. The profile module 312 then accesses the profiles stored in the profile database 320 to determine one or more applicable agents 104 which may receive the inbound communication. For example, if the inbound communication comprises a general, technical problem, then profiles of agents 104 associated with the technical support group are reviewed. Because the inbound communication is of a general nature, a first level (e.g., lower experienced) agent 104 may be sufficient to respond to the inbound communication. First level agents 104 enabled to receive the inbound communication type (e.g., voice call, e-mail, etc.) are deemed "applicable."

In another example, if the inbound communication is from an important or high volume customer regarding sales (e.g., received via a dedicated phone number), the profiles of the sales group are reviewed. Because the customer is considered to be special, a higher level (e.g., more experienced) agent 104 may be required to respond to the inbound communication. Therefore, profiles are reviewed to determine high level agents 104 applicable to receive the inbound communication type.

The profiles may also indicate a priority in which agents 104 should receive calls. For example, two agents 104 may both be level three sales support agents 104. Thus, both of the agents 104 may be capable of handling inbound communication. In this situation, the profile may indicate that one agent 104 has priority over the other (e.g., one may be a supervisor of the other).

In an alternative embodiment, a master rule set or general policy may be utilized if no priority data is stored in the agent profiles. The general policy may prioritize agents 104 to receive inbound communications based on such factors as time of last inbound communication handled by the agent 104, number and types of inbound communications currently being handled by each agent 104, number of inbound communications handled so far during the day, or any other criteria which will allow for a fair or reasonable distribution of the inbound communications between the applicable agents 104.

Further in step 608, preferences associated with the profiles may be taken into consideration. For example, an agent 104 may not want to respond to voice calls via a desk phone, but by a cell phone during a certain time period. In exemplary embodiments, the preferences for an agent 104 are set up by the agent 104 or an administrator in the individual profile associated with the agent 104.

In some embodiments, the review of profiles may be performed one profile and/or one agent 104 at a time until an applicable agent 104 is found. In other embodiments, the determination may be performed for a plurality of policies and/or agents 104, and a list of applicable agents 104 may be generated. This list may be prioritized. In yet other embodiments, only profiles of agents that have an available status are reviewed.

A match process is performed in step 610 to determine which agent 104, if one is available and applicable, should receive the inbound communication. An agent 104 is considered available and applicable if the communication status of the agent 104 indicates the agent 104 is available to receive the inbound communication and the agent's profile indicates that the agent 104 satisfies the conditions to receive the inbound communication. In exemplary embodiments, the match module 314 will review the status data via the status module 310 and/or status database 322 and the applicability data via the profile module 312 and/or profile database 320, and cross-correlate the data to determine one or more agents 104 that satisfy all conditions to receive the inbound communication.

It should be noted that steps 606 and 608 may be reversed. That is the profile may be reviewed for applicable agents prior to a status check on the agents. In this embodiment, the status of one agent 104 at a time may be reviewed by the match module 314. For example, a priority list may be generated based on the reviewed profiles. The availability of each agent 104 on the list is then reviewed one at a time in successive order until an appropriate agent 104 match occurs (i.e., applicable agent 104 is also available). Alternatively, a status check of all agents may be performed.

If no appropriate agent 104 is available for the particular type of inbound communication, then the customer 106 is placed on hold in step 612 until an appropriate agent 104 becomes available. Alternatively, the customer 106 may be offered a choice to leave a message or access the agents 104 via a different mechanism. For example, if no appropriate agents 104 are available to respond to a chat message but agents 104 are available for receiving voice calls, the customer 106 may receive a suggestion to call or use VoIP to access an agent 104 for immediate assistance.

If the appropriate agent 104 is selected in step 610, the inbound communication is routed to the agent communication device 204 of the selected, appropriate agent 104 in step 614. For example, an inbound e-mail message, text message, or chat message is sent to the selected agent's computing device 210, while a voice call may be sent to the phone 208.

Once the selected agent 104 receives the inbound communication, the agent 104 status is updated with the central status device 202 in step 616. For example, if the agent 104 receives a voice call on the phone 208, the agent's communication status is updated to indicate that the agent 104 is on a voice call (e.g., the PBX server 214 updates agent status with the central status device 202). As a result, the agent 104 may not receive another voice calls via their phone 208, or may only receive inbound communications on their computing device 210, based on their profile.

As such, embodiments of the present invention determine an appropriate agent 104 based on availability (e.g., review of communication statuses) and applicability (e.g., review of profiles). Based on the profile associated with an agent 104, the agent 104 may be enabled to handle a plurality of same and/or different types of inbound communications concurrently. This allows maximizing of agent 104 productivity.

It should be noted that the method of FIG. 6 is exemplary. Alternative embodiments may perform the method in a different manner, but still achieve the result of selecting an appropriate agent 104 to forward the inbound communication to. For example, steps 604 and 606 may be practiced in reverse order. That is, the applicability of the agents 104 may be determined first, and then the statuses of applicable agents may be reviewed for availability. In yet other embodiments, the match module 314 may perform the steps of 604-610 substantially simultaneously, for example.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A method for queuing a type of inbound communication, the method comprising:
   receiving the type of inbound communication at a communication server associated with the type of inbound communication;
   determining availability of one or more agents associated with the type of inbound communication;
   reviewing one or more profiles of the one or more agents to assess applicability of each of the one or more agents to handle the type of inbound communication, at least one of the profiles comprising a guideline for one or more combinations of maximum inbound communication types and number of inbound communications that at least one of the agents may handle concurrently;
   selecting an appropriate agent of the one or more agents based on the availability of the appropriate agent to accept the type of inbound communication and applicability of the appropriate agent to concurrently handle one or more inbound communications;
   forwarding the type of inbound communication to the appropriate agent; and suggesting to a customer to use another type of inbound communication when the customer is attempting the type of inbound communication and no appropriate agent is available for the type of inbound communication.

2. The method of claim 1 further comprising placing the type of inbound communication in a hold queue if no appropriate agent is available.

3. The method of claim 1 wherein determining availability comprises reviewing communication statuses of the one or more agents.

4. The method of claim 1 wherein reviewing one or more profiles comprises determining a priority list of the one or more agents.

5. The method of claim 1 further comprising maintaining an information record associated with the type of inbound communication.

6. The method of claim 5 further comprising utilizing the information record to determine a set of one or more agents to direct the type of inbound communication.

7. The method of claim 1 wherein selecting the appropriate agent occurs at a central status device.

8. The method of claim 1 wherein selecting the appropriate agent occurs at a communication server.

9. The method of claim 1 further comprising receiving a login associated with one communication device from the agent and universally logging in the agent for all other associated communication devices, a success flag being associated with each associated communication device that is successfully logged in.

10. The method of claim 1 further comprising receiving a presence indication from an agent and notifying all associated communication servers of the presence of the agent.

11. The method of claim 1 further comprising changing a status of the appropriate agent after the inbound communication is routed to the appropriate agent.

12. The method of claim 1 further comprising establishing a group profile for a group of agents, the group profile providing a routing priority if more than one agent is available.

13. The method of claim 1 further comprising establishing an individual profile for an agent.

14. The method of claim 1 wherein each of the one or more profiles indicates whether an agent is allowed to concurrently handle more than one inbound communication.

15. The method of claim 1 wherein at least one of the profiles comprises guidelines indicating the associated agent is capable of handling a plurality of types of inbound communications.

16. The method of claim 1 wherein selecting the appropriate agent further comprises evaluating at least one of:
  a productivity of at least one of the one or more agents;
  a time elapsed since a last forwarding of the type of inbound communication to at least one of the one or more agents; and
  a preexisting customer relationship between a customer initiating the type of inbound communication and at least one of the agents.

17. The method of claim 1 wherein selecting the appropriate agent further comprises evaluating the time elapsed since a last forwarding of the type of inbound communication to at least one of the one or more agents.

18. A system for queuing a type of inbound communication, the system comprising:
  a status module configured to maintain communication statuses of a plurality of agents;
  a profile module configured to maintain profiles of the plurality of agents across a plurality of communication types, each profile providing guidelines for allowing the agent to concurrently handle one or more types of inbound communications;
  a match module configured to select an appropriate agent associated with the type of inbound communication to direct the type of inbound communication based on the availability of the agent to concurrently handle multiple communications of the same type, the match module further configured to suggest to a customer to use another type of inbound communication when the customer is attempting the type of inbound communication and no appropriate agent is available for the type of inbound communication; and
  a profile database configured to store the profiles of the one or more agents, at least one of the profiles comprising a guideline for one or more combinations of maximum inbound communication types and number of inbound communications that at least one of the agents may handle concurrently.

19. The system of claim 18 further comprising a communications management server configured to maintain an information record associated with the type of inbound communication.

20. The system of claim 18 further comprising a universal login module configured to log in the agent to all associated communication servers or devices of the agent based on a single login action.

21. A non-transitory machine-readable storage medium having embodied thereon a program, the program comprising instructions for a method for queuing an inbound communication, the method comprising:
  determining availability of one or more agents associated with a type of inbound communication;
  reviewing one or more profiles of the one or more agents to assess applicability of each of the one or more agents to handle the type of inbound communication, at least one of the profiles comprising a guideline for one or more combinations of maximum inbound communication types and number of inbound communications that at least one of the agents may handle concurrently;
  selecting an appropriate agent of the one or more agents based on the availability of the appropriate agent to accept the type of inbound communication and applicability of the appropriate agent to concurrently handle one or more inbound communications;
  forwarding the type of inbound communication to the appropriate agent; and
  suggesting to a customer to use another type of inbound communication when the customer is attempting the type of inbound communication and no appropriate agent is available for the type of inbound communication.

* * * * *